United States Patent Office 3,849,536
Patented Nov. 19, 1974

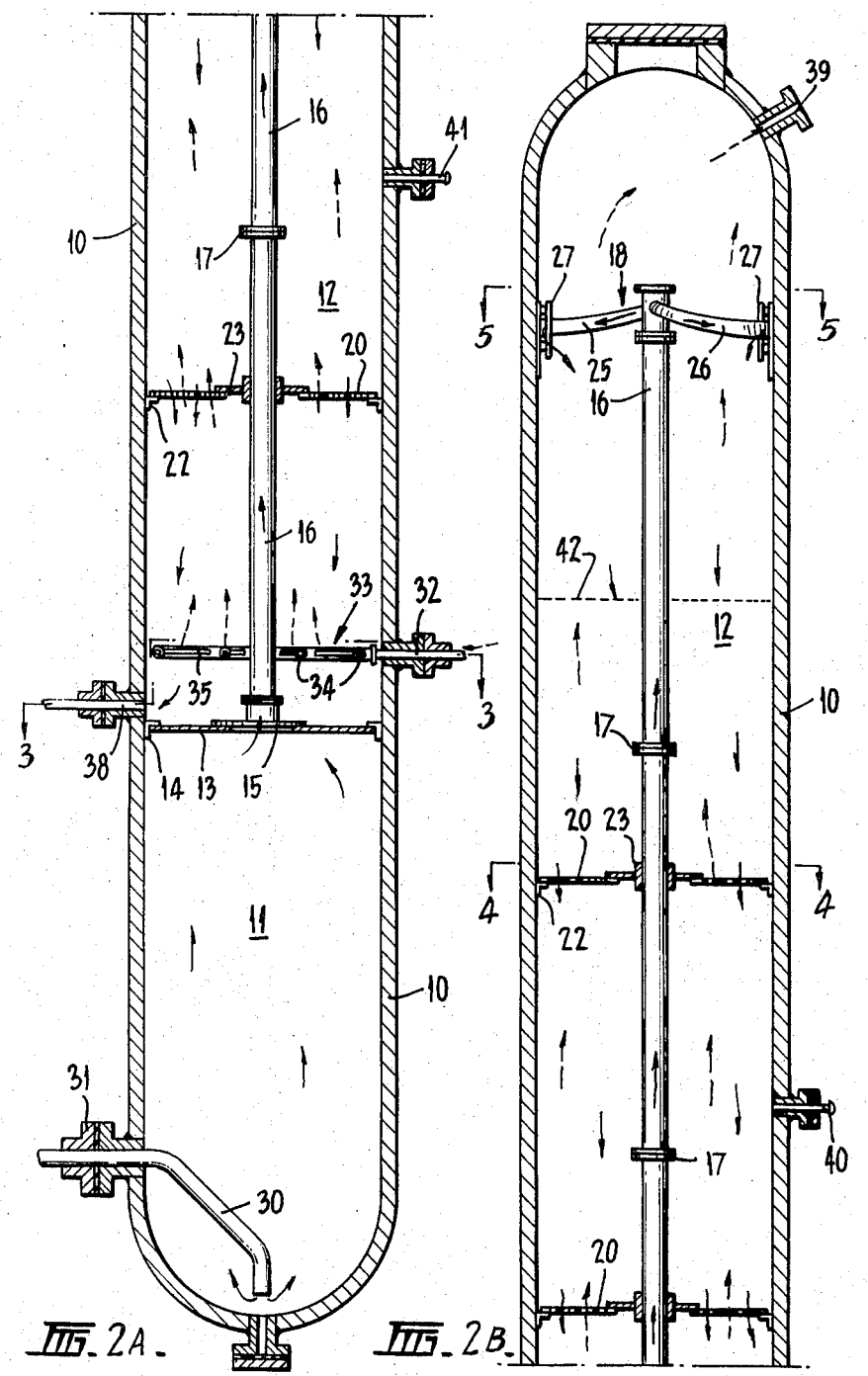

3,849,536
WET COMBUSTION OF WASTE LIQUORS
John Edward Morgan, Burnie, Tasmania, Australia, assignor to Associated Pulp and Paper Mills Limited, Melbourne, Victoria, Australia
Filed Aug. 31, 1971, Ser. No. 176,651
Claims priority, application Australia, Aug. 31, 1970, 2,374/70
Int. Cl. C01d 1/04; C02b 1/34; D21c 11/14
U.S. Cl. 423—206                                    2 Claims

ABSTRACT OF THE DISCLOSURE

Method and apparatus for wet combustion of waste liquors such as obtained from the soda process for the pulping of wood comprising subjecting the waste liquor to a first stage oxidation treatment with air under pressure, separating inert gases and gaseous products of oxidation from the partially oxidised liquid phase thereby reducing the partial pressure of inert gases in equilibrium with the partially oxidised liquid phase, and subjecting the partially oxidised liquid phase to a second stage oxidation treatment with air under pressure.

---

This invention relates to improvements in the wet combustion of waste liquors containing combustible organic materials and refers especially to improvements which facilitate the wet combustion of waste liquor obtained from the soda process for the pulping of wood, but the invention has several concomitant advantages in relation to the wet combustion of other waste liquors containing organic materials.

In the known art of wet combustion the waste liquor which contains combustible organic material in aqueous solution or in fine dispersion and also may contain in addition inorganic substances in solution is mixed with an oxygenating gas such as air under superatmospheric pressure and the temperature of the mixture is adjusted to or maintained at a value not exceeding the critical temperature of water.

The aim of wet combustion is to bring about partially complete or substantially complete oxidation of the organic content of waste liquors in the aqueous phase and whereby such organic content is partially or completely converted to the ultimate oxidation products of carbon dioxide and water and thereby the organic content of the waste eliminated or reduced to a desired degree. Where the organic constituents contain in addition other elements such as sulphur, nitrogen or phosphorus it is noted that these will usually be oxidised partially or completely to their highest stable states of oxidation under the prevailing conditions but applicant's invention is independent of the presence or absence of such other constituents.

It is an object of applicant's invention to provide a new and improved method and arrangement of apparatus for the carrying out of the process of wet combustion so as to secure a complete or substantially complete elimination of the organic content of a waste liquor, and a further object is to enable the wet combustion process to be used for this objective in a more practicable and economical manner than previously available.

Applicant's invention provides a method of securing a complete or substantially complete elimination of the organic content of the waste liquor from the soda process of wood pulping, thereby facilitating the subsequent recovery of the inorganic chemical materials of value in such waste liquor after the wet combustion process, and applicant's method is also applicable to other types of waste liquors when it is desired for any reason to secure the substantially complete removal of its organic content.

When the wet combustion method can be arranged to achieve substantially complete oxidation of the carbon content of the organic material to carbon dioxide and the hydrogen content of the organic material to water the net and final result is substantially equivalent to that achieved by normal dry combustion of the same organic material in the presence of an excess of oxygen over the theoretical requirement and, as regards the net overall chemical reaction and the exothermic heat of reaction associated with such reaction, is substantially identical in both cases.

Dry combustion of an organic material in the presence of a reasonable excess of oxygen above theoretical true requirement normally proceeds to completion very rapidly when the temperature is high and flame is present. The ignition point of dry organic materials varies widely depending on their composition but, for example, in the case of pure carbon is of the order of 1,200° F. and after ignition the flame temperatures are much higher to the order of 3,000° F. or higher. Under such conditions the combustion or oxidation reactions are very rapid and complete and intermediate stages are not readily defined or identified.

Wet combustion, by definition, must proceed in the aqueous phase and at temperatures not exceeding the critical temperature of water (705.4° F.) and in practice it is limited to temperatures of the order of 600° F. due to excessive evaporation of water as the critical temperature of water is more closely approached.

In wet combustion the necessity to use such low temperatures relative to those which apply in dry combustion, combined with the situation that the organic concentration in aqueous waste liquors is usually low, of the order of ten per centum by weight, results in relatively slow rates for the oxidation or combustion reactions such that these may be only partly complete unless impracticably long terms of reaction are employed.

In the case of wet combustion of soda process waste liquor applicant has found that the organic content can be eliminated to the extent of about ninety per centum of that originally present in relatively short reaction times but complete oxidation of the balance of the organic material to carbon dioxide and water requires a total reaction time in excess of that economically practicable. Similar observations in respect of other waste liquors have been noted by applicant.

For soda process waste liquor, applicant discloses a typical relation between the percentage of organic material completely oxidised and the time of reaction for such degree of oxidation expressed in arbitrary units, and this is shown in FIG. 1 of the accompanying drawings from which it is observed that theoretically complete oxidation is approached only asymptotically with time.

In the case of soda process waste liquors and in a wide range of waste liquors containing organic materials a great variety of complexity of the organic compounds present has been observed, and it has also been found that whereas some of these compounds are readily oxidised others are more resistant to oxidation in varying degrees.

Applicant's studies and experiments have shown that in the process of wet combustion some organic materials may be oxidised rapidly and substantially by a more or less direct route to carbon dioxide and water while in other cases they may be converted into other clearly defined organic compounds representing intermediate stages of oxidation, which compounds are relatively resistant to complete oxidation except under more severe conditions or long reaction times.

For example, in the case of soda process waste liquor and other similar waste liquors from wood pulping operations applicant has observed that a substantial proportion of the lignin and other humic materials of high molecular weight derived from wood and present in the liquor oxidise substantially and directly to carbon dioxide and water but in addition produce as intermediate products a smaller proportion of low molecular weight carboxylic acids normally in the form of sodium salts, such as sodium acetate and related acids or acid salts, which are found to require longer reaction times and generally more severe conditions for their ultimate complete oxidation.

In the treatment of soda process waste liquor by the wet combustion process one objective is to eliminate to the maximum possible extent all organic materials and in particular those which are combined chemically with sodium since it is usually desired to recover the sodium values from the treated liquor. Sodium-organic compounds such as sodium acetate cannot be readily converted to forms such as sodium carbonate, sodium bicarbonate or sodium hydroxide which are desired for recovery of sodium values.

The above description of the advantages and objectives of the applicant's invention in relation to soda process waste liquor does not exclude its advantageous application to other types of waste liquors where similar problems may exist and where very high degrees of elimination of residual organic material are desired for similar or other reasons.

Applicant has found with reference to FIG. 1 that the bulk of the oxidation of the high molecular weight compounds which represent up to ninety per centum of the total organic material in soda process waste liquor is controlled by mass transfer and that large interfacial contact areas are advantageous.

Applicant has further found that where such primary oxidation of the bulk of the organic material gives rise in part to a compound such as sodium acetate, in the case of soda process waste liquor, the further oxidative reactions needed to convert such sodium acetate or related or similar substances to carbon dioxide and water are controlled by other factors such as the partial pressure of oxygen and the residual concentration of the organic materials in the aqueous phase, and it has also been found that such residual concentration continually diminishes as the reaction proceeds to theoretical completion. For example, applicant has found that in the case of the sodium acetate residual arising after the partial wet combustion of soda process black liquor, this sodium acetate further oxidises to carbon dioxide and water at a reaction rate described by the following equation (1).

$$-dC_A/dt = k[C_A]^x[C_B]^y$$

where $[C_A]$ = concentration of sodium acetate.
$[C_B]$ = concentration of oxygen.
$x$ = order of reaction with respect to sodium acetate.
$y$ = order of reaction with respect to oxygen.
$k$ = reaction rate constant
$-dC_A/dt$ = rate of decomposition of sodium acetate.

From the above equation, applicant has deduced that whereas the concentration of sodium acetate ($C_A$) cannot be varied easily and will diminish continuously as the reaction proceeds, the reaction rate, that is the rate of decomposition to carbon dioxide and water, can be substantially increased by increasing the partial pressure of oxygen in contact with the liquid phase.

In the known art of wet combustion the oxygen in the form of air or other oxygenating gas is mixed under suitable pressure and temperature conditions with the waste liquor and is usually arranged to flow co-currently with the liquor through the reaction space the volume of which is adjusted to allow sufficient reaction time for the reaction to proceed to the desired degree of completion. Alternatively, after mixing the reaction may be allowed to proceed for any given time in a batch type of reactor.

In the above embodiments of the prior art it is obvious that after the bulk of the reaction is completed the concentration of residual organic material is low and additionally the oxygen partial pressure is low because it is neither practical or economic to employ a large excess of oxygen above that theoretically required, and in practice such excess is usually adjusted to the order of 0.5 to 1.0 per centum above the theoretical amount which can be calculated or otherwise determined.

According to applicant's invention the introduction of oxygen, usually in the form of air or other oxygen-containing or oxygenating gas (referred to in this specification and in the claims as "air") is effected in not less than two stages, each stage being conducted either co-currently with the liquor or countercurrently with the liquor, and the proportion of air added at each stage is related to the amount of oxidation required in each stage. Further, between each stage of oxidation the gaseous products of oxidation, namely carbon dioxide and some water vapour, are separated from the partially oxidised liquid phase together with the inert nitrogen content of the air employed (or other inert constituents of the oxygenating gas) thus reducing the partial pressure of inert gases and carbon dioxide (hereinafter referred to as "inert gases") in equilibrium with the liquid phase. The balance of air containing the requisite oxygen is then introduced into the partially oxidised and separated liquid or aqueous phase whereby the partial pressure of oxygen will be higher than would be obtainable in the case of the prior art where it would be relatively low due to the carbon dioxide from the prior oxidation reactions and also the presence of the residual nitrogen or other inert components of the air.

The temperature of the liquid phase in the first stage and in the second stage of the process is preferably maintained between 450° F. and 705.4° F. In each case the temperature is preferably maintained between 600° F. and 625° F. The pressure is preferably maintained between 70 and 225 atmospheres.

In one form of applicant's invention pure oxygen or substantially pure oxygen or oxygen-rich gas rather than air or other dilute oxygenating gas may be used in the second or later stages of the process to achieve the highest possible partial pressure of oxygen. Whereas substantially pure oxygen could be theoretically used in the first stage of oxidation this is restricted in practice because the reaction may proceed with explosive violence in the presence of a relatively high concentration of readily oxidisable organic material existing at the beginning of the process.

As well as the increase in the rate of oxidation made possible by the applicant's invention, there are several concomitant advantages. In the prior art the degree of oxidation of organic material could not be easily controlled since the volume of the vessel in which reaction takes place could not be easily changed, provided of course that sufficient oxygen was present for substantially complete oxidation.

Applicant's invention allows the volume available for reaction to be controlled easily by raising or lowering the level of the liquid phase in the second or later stages of oxidation.

A further advantage in the case of soda process waste liquor or other carbonate-containing liquors is the substantial reduction in the sodium bicarbonate content of the oxidised liquor which is brought about by the countercurrent flow of the air or oxygenating gas used in the second or later stages or oxidation, such air being substantially free of carbon dioxide and thereby reducing the partial pressure of carbon dioxide in and above the liquid phase. The reduction in sodium bicarbonate content reduces the quantity of calcium hydroxide required for the conversion of the soda-containing oxidised liquor to sodium hydroxide, such conversion and recovery of sodium in the form of sodium hydroxide values being the usual final objective of the process.

The above concomitant advantages are not restricted to soda process waste liquors but may apply to a wide range of situations such as other carbonate-containing waste liquors which may contain metals other than sodium as major inorganic constituents.

For a practical embodiment of the invention in a wet combustion system reference is made to FIGS. 2A to 5 of the accompanying drawings to illustrate a suitable apparatus, but this in no way restricts the principle of applicant's invention to this particular form of apparatus. In these drawings:

FIGS. 2A and 2B are views in sectional elevation of a pressure vessel fitted with apparatus for carrying out the invention, FIG. 2A showing the lower part of the vessel and FIG. 2B the upper part.

Figure 1:
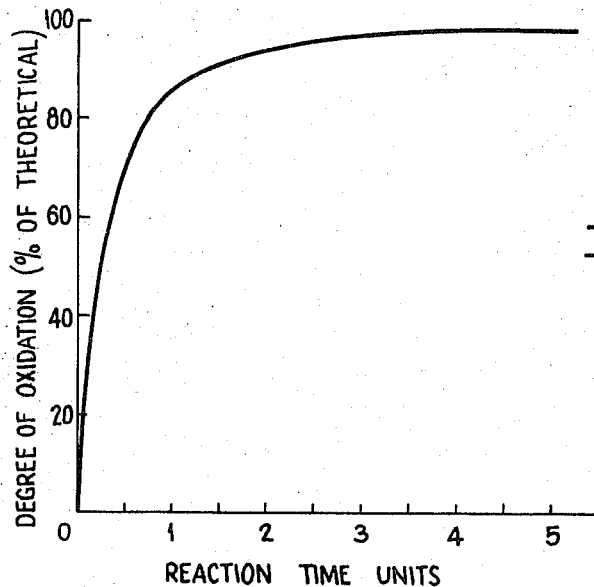

The apparatus shown in the drawings provides for a two-stage introduction of air with one stage of separation embodied between the first and second stages of oxidation and further embodies a co-current flow of air and waste liquor in the first stage with a countercurrent flow of air and partially oxidised liquor in the second stage thus achieving maximum efficiency of oxidation in this stage.

Further, in this particular embodiment of the invention the separator volume provided for the separation of gas and liquid between the first and second stage is also used simultaneously for separation after the second stage thus achieving a practical constructional advantage in the apparatus.

In the apparatus shown in the drawings, the reference numeral 10 indicates an elongated vertical pressure vessel or reactor, having a lower zone 11 in which the first reaction stage of the wet combustion process takes place, and an upper zone 12 in which the second reaction stage takes place. For convenience of illustration, the liquors present in the vessel 10 are not shown.

The lower zone 11 is separated from the upper zone 12 by an imperforate plate 13 which is secured at its outer edge to a ring 14 mounted on the inner wall of the vessel 10 and at its inner edge to a plate 15 secured to the lower end of a vertical pipe 16 arranged centrally in the vessel 10. The pipe 16 is formed in sections which are secured together at junctions 17. The lower end of the pipe 16 communicates with the lower zone 11 and its upper end communicates with a separating and distributing device 18 which is described below.

Figure 4:
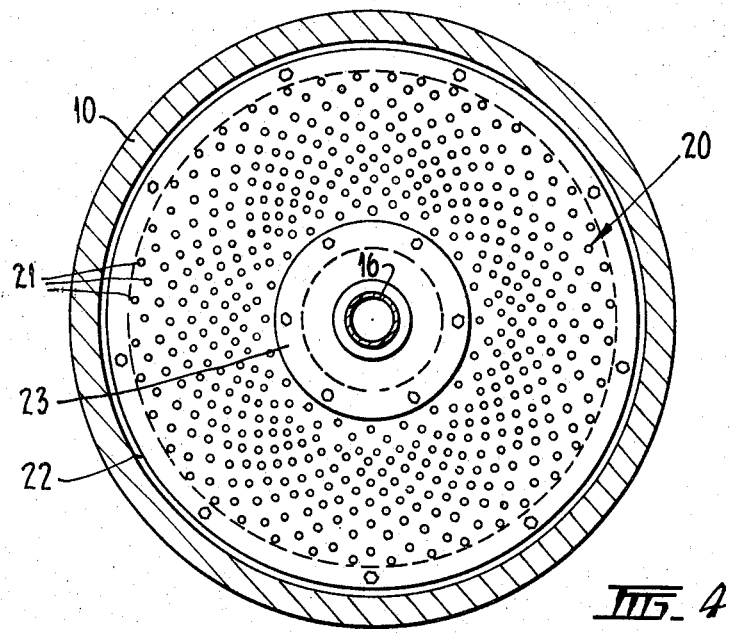
FIG. 4 is a view in sectional plan taken on the line 4—4 of FIG. 2B.

A series of perforated baffles 20 are arranged at vertically spaced intervals in the upper zone 12, each perforated baffle (which is shown more fully in FIG. 4) having a large number of perforations 21 and being supported between a ring 22 on the inner wall of the vessel 10 and a ring-shaped support 23 secured to the pipe 16.

Figure 5:
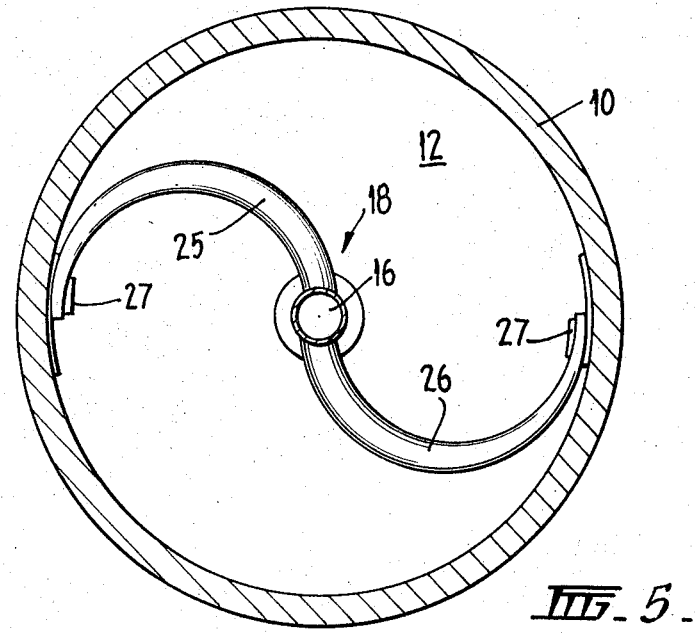
FIG. 5 is a view in sectional plan taken on the line 5—5 of FIG. 2B.

The separating and distributing device 18 comprises two curved pipes 25 and 26 which are connected at their inner ends to the upper end of the pipe 16 and are attached at their outer ends to the inner wall of the vessel 10 by brackets 27. The pipes 25, 26 are shaped so as to deliver material from their outer ends in a tangential direction adjacent to the inner wall of the vessel 10 (see FIG. 5).

Figure 3:
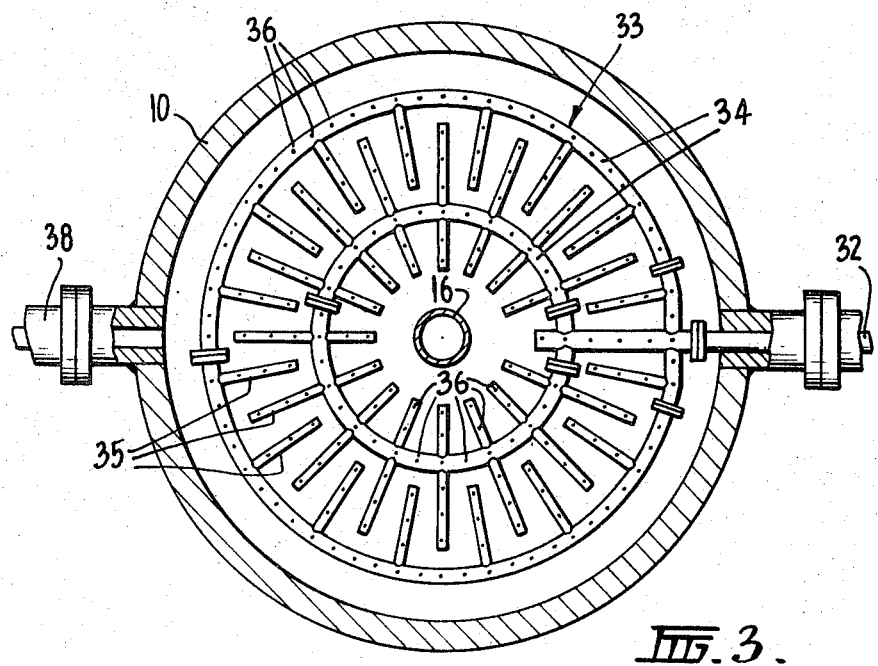
FIG. 3 is a view in sectional plan taken on the line 3—3 of FIG. 2A.

Referring to FIGS. 2A and 3, an inlet nozzle 30 is provided at the lower end of the vessel 10 within the zone 11, entering the vessel at flange 31. A secondary air inlet pipe 32 is provided to extend through the wall of the vessel 10 at a short distance above the plate 13, that is, at the lower part of the upper zone 12, and the inlet pipe 32 is connected to an air disperser 33 within the vessel 10 which consists of two circular pipes 34 and a series of radial pipes 35 all of which are provided with perforations 36 in their surfaces (see FIG. 3).

A liquor discharge outlet pipe 38 is provided to extend through the wall of the vessel 10 at the lower end of the upper zone 12.

A gas discharge vent 39 is provided at the upper end of the vessel 10. A temperature nozzle 40 and a sampling nozzle 41 are provided at suitable positions in the wall of the vessel 10.

The level of the liquid in the zone 12, which may be varied up or down as described below, is indicated diagrammatically at 42.

Air and black liquor are admitted to the zone 11 through nozzle 30, and air is admitted through inlet 32 and disperser 33 to the bottom of the second reaction zone 12. The central pipe 16 communicates between the first reaction stage 11 and the separating and distributing device 18, at the upper end of the reactor. Liquor is discharged from the outlet 38 located near the lower end of the second reaction zone 12.

The apparatus of FIGS. 2A to 5 was used to process waste liquor, hereinafter called black liquor, derived from the soda process of pulping wood. The black liquor was processed on a continuous basis using the wet combustion process.

A mixture of air and black liquor comprising about 221.5 lb./min. nitrogen, about 66.5 lb./min. oxygen, about 555 lb./min. water and about 73 lb./min. total dissolved solids (such 73 lb./min. of solids including about 23 lb./min. of sodium in combined form but calculated and expressed as the equivalent weight of sodium hydroxide) at a superatmospheric pressure of about 210 atmospheres and preheated to about 300° F. was introduced continuously to the first reaction stage 11 of the reactor 10 via the inlet nozzle 30 and a suitable disperser (not shown) consisting of a single or multiple orifice arrangement designed to produce high turbulence and large interfacial areas for gas and liquid phase contact. The proportion of oxygen introduced in this first stage of oxidation was about 90% of that theoretically required for substantially complete oxidation.

The mixed gases and liquor were passed upwardly and co-currently through the first reaction stage 11 wherein oxidation of the organic material proceeded exothermally with the process controlled so that the temperature was about 608° F. and the total system pressure was maintained at about 210 atmospheres.

Partial oxidation of the organic materials in the black liquor was achieved during passage of the mixture through the first reaction stage 11 and about 29 lb./min. of water and about 86 lb./hr. of carbon dioxide were formed as reaction products, but about 19 lb./hr. of this carbon dioxide produced was found to be chemically combined with sodium in the form of sodium carbonate and/or sodium bicarbonate or was partly as a solution of gas in the aqueous phase. The partially oxidised liquor which resulted from this final oxidation stage comprised about 7.5 lb./min. of unoxidised organic material mainly in the form of sodium acetate together with the sodium in combined form present in the original black liquor.

After the first reaction stage 11 the mixture of partially oxidised liquor and gases was caused to pass upwards through the central tube 16 to the separating device 18 which discharged into the upper portion of the reactor where the gas phase and liquid phase were separated. The gas moved upwards and was vented from the reactor via the discharge vent 39. The partially oxidised liquor was arranged to move downwards and entered the second reaction zone 12.

A large proportion of the exothermic heat generated in the first reaction zone 11 was transferred by conduction and convection to the second reaction zone 12 in such amount that the temperature of the second reaction zone 12 was maintained at about 608° F.

Air comprising about 24.5 lb./min. nitrogen and about 7.5 lb./min. oxygen was introduced continuously to the lower section of the second reaction zone 12 via the inlet pipe 32 and the disperser 33. This air moved upwards against the downwardly flowing liquor and through the perforated baffles 20 designed to cause intimate mixing of the gas and liquid at that point and to provide hydrodynamic conditions in the second reaction zone 12 conducive to maximum decomposition of the remaining organic material.

When the downwardly flowing liquor reached the outlet nozzle 38 substantially complete oxidation was found to be achieved provided the level 42 of the liquid in this second reaction zone 12 had been maintained at a suitable level related to the desired retention time in this zone. By controlling the rate of discharge of the liquor from the outlet 38, the level 42 of the liquor in the zone 12 could be lowered, or raised, thereby varying the volume of liquid in contact with the oxygenating gas and providing a control of the amount of organic material completely or substantially completely oxidised.

It was found that in the apparatus of FIGS. 2A to 5 the partial pressure of oxygen immediately after entry to the second reaction zone 12 was approximately 23 atmospheres which is the same as the partial pressure of oxygen immediately after entry to the first reaction zone 11. In the prior art the partial pressure of oxygen assuming 90% of the organic material had been decomposed would have been approximately two atmospheres. Applicant has found that the values of $y=0.5$ and $x=1.0$ apply to equation (1) for the specific case of oxidation of sodium acetate. It is then evident that at least a ten-fold increase in oxygen partial pressure is available during the final 10% of the oxidation reaction which equation (1) shows to result in an increase in the rate of decomposition of about three to four times, thus achieving the object of applicant's invention.

What is claimed is:

1. A two-stage continuous method of wet combustion of a waste liquor obtained from the soda process for the pulping of wood and containing combustible components, which method comprises the serially succeeding steps of mixing a stream of the waste liquor with heated oxygenating gas under pressure;

passing the mixture at a temperature between 450° and 705.4° F. and under a pressure between 70 and 225 atmospheres upwardly through a first reaction zone in the lower compartment of a generally vertical pressure vessel wherein to effect combustion of a major part of the combustibles content of the stream into an inert gaseous phase comprising carbon dioxide and steam, with generation of heat;

passing the resulting partially oxidized mixture composed of gaseous phase and liquid phase, at elevated temperature, under pressure upwardly into a second reaction zone in an upper compartment of said pressure vessel, the said partially oxidized mixture being passed as a stream upwardly through but out of direct contact with liquid phase in the second reaction zone and being then distributed into said second reaction zone above such liquid phase;

separating the said inert gaseous phase from liquid phase of the partially oxidized mixture in the upper part of the second reaction zone, discharging the said inert gaseous phase from the upper part of the said second reaction zone, thereby reducing the partial pressure of the inert gaseous phase in equilibrium with the said liquid phase, causing the separated liquid phase to flow downwardly as a column of liquid in said second reaction zone, the temperature of the downwardly flowing column of liquid being at a temperature between 450° and 705.4° F. and under a pressure between 70 and 225 atmospheres;

subjecting the residual combustibles content to said downwardly flowing column of liquid, substantially free from the aforesaid gaseous phase, to further oxidation treatment by passing an oxygenating gas under pressure upwardly through said column of liquid, thereby forming a further gaseous phase and a substantially combustibles-free liquid phase, the partial pressure of oxygen in contact with the liquid phase in the second reaction zone being at least as great as the partial pressure of oxygen in contact with the liquid phase in the first reaction zone, and the temperatures in the first reaction zone and in the second reaction zone being substantially the same;

continuously discharging said further gaseous phase, in admixture with the first-mentioned gaseous phase, from above said column of liquid; and continuously withdrawing liquid phase, substantially free from combustibles, from the lower part of the second reaction zone.

2. A method according to claim 1 wherein oxygen or oxygen-rich gas is used in the second stage treatment.

References Cited

UNITED STATES PATENTS

| | | | |
|---|---|---|---|
| 1,404,708 | 1/1922 | Allbright | 260—409 |
| 3,574,051 | 4/1971 | Shah | 23—48 X |
| 3,617,033 | 11/1971 | Ichikawa et al. | 23—285 |

MILTON WEISSMAN, Primary Examiner

U.S. Cl. X.R.

23—285; 162—30; 210—63